(12) United States Patent
Tamori

(10) Patent No.: US 7,351,904 B2
(45) Date of Patent: Apr. 1, 2008

(54) INFORMATION PROCESSING APPARATUS AND METHOD, PROGRAM AND RECORDING MEDIUM

(75) Inventor: Hirofumi Tamori, Tokyo (JP)

(73) Assignee: Sony Corporation, Tokyo (JP)

( * ) Notice: Subject to any disclaimer, the term of this patent is extended or adjusted under 35 U.S.C. 154(b) by 361 days.

(21) Appl. No.: 11/196,375

(22) Filed: Aug. 2, 2005

(65) Prior Publication Data

US 2006/0064381 A1 Mar. 23, 2006

(30) Foreign Application Priority Data

Aug. 31, 2004 (JP) ............................. 2004-251455

(51) Int. Cl.
*A63H 5/00* (2006.01)
*G04B 13/00* (2006.01)
(52) U.S. Cl. .......................................... 84/609; 705/51
(58) Field of Classification Search .................. 705/51; 84/609, 645
See application file for complete search history.

(56) References Cited

U.S. PATENT DOCUMENTS 6,989,485 B2 * 1/2006 Ochi ........................... 84/645

2001/0029832 A1 10/2001 Kanda et al.
2003/0177888 A1 * 9/2003 Akahori et al. ............... 84/609

FOREIGN PATENT DOCUMENTS

JP 2001-229281 8/2001

\* cited by examiner

*Primary Examiner*—Jeffrey Donels
(74) *Attorney, Agent, or Firm*—Bell, Boyd & Lloyd LLP

(57) ABSTRACT

Information processing apparatus and method, program and recording medium are provided. The information processing apparatus including a first generating section for editing tone data made up of a plurality of tracks, on the basis of an operation by a user, by using each data of the plurality of tracks, to generate tone data made up of the smaller number of tracks, the tone data being secondary copyrighted work with the tone data made up of the plurality of tracks being original copyrighted work; a second generating section for generating a use information track describing information which describing how data of each track of the tone data of the original copyrighted work is used in the tone data generated by the first generating section; and a setting section for setting first copyright information with a user who edited tone data of original copyrighted work specified as a copyright holder to the tone data generated by the first generating section and data of the use information track generated by the second generating section.

9 Claims, 14 Drawing Sheets

FIG. 5

| COPYRIGHT HOLDER ID | FEE | REPRODUCTION COUNT LIMIT | COPY COUNT LIMIT | EXPIRATION DATE | ... |
|---|---|---|---|---|---|
| 0001 | ¥1/SECOND | 10 TIMES | 3 TIMES | 2005/12/31 | ... |

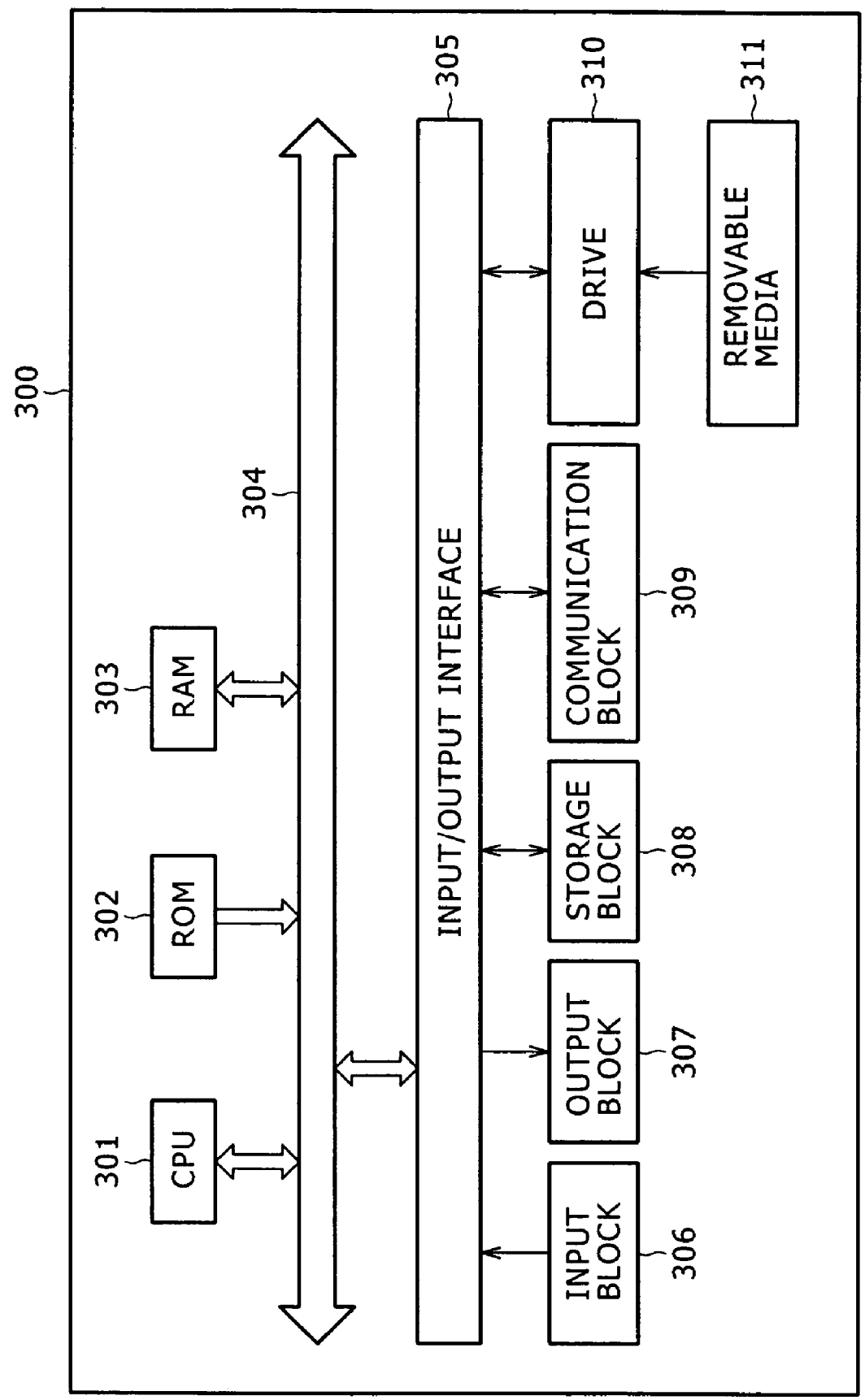

INFORMATION PROCESSING APPARATUS AND METHOD, PROGRAM AND RECORDING MEDIUM

CROSS REFERENCE TO RELATED APPLICATION

The present application claims priority to Japanese Patent Application No. 2004-251455 filed in the Japan Patent Office on Aug. 31, 2004, the entire contents of which being incorporated herein by reference.

BACKGROUND

The present invention relates to an information processing apparatus and method, a program, and a recording medium and, more particularly, to an information processing apparatus and method, a program, and a recording medium that are adapted to properly protect the copyright of content including music tones providing secondary copyrighted work and the copyright of the original copyrighted work of that content.

In related-art music distribution techniques, it is a main practice that audio data made up of a plurality of discretely recorded tracks is imparted with stereo effect (namely divided into two channels) by means of mix-down (or track-down) to be recorded to recording media such as CDs for sale. Normally, general listeners listen to music through media such as CDs, magnetic tapes, records, for example. These media are currently two-channel media, or stereo media. Therefore, a mix-down processing is executed in which the number of tracks, 4 to 48 or more, are edited to convert into two tracks (namely, two-channel stereo).

In contrast to the above-mentioned music distribution through recording media, a new music distribution method has been gaining popularity as music distribution business in which stereo digital audio data is encoded (or compressed), the compressed stereo digital audio data is stored in a server connected to the Internet, the music data desired by user is selected from the stored data to be downloaded from this server, and the downloaded data is decoded (or decompressed) for reproduction.

For example, in producing a piece of music composed of drums, base, piano, and vocal, the players of these musical instruments including a vocalist are assembled in a recording studio and a drum part played by the drummer, a base part played by the bassist, a piano part played by the pianist, and a vocal part performed by the vocalist are recorded by a digital audio recorder. The music producer reproduces the recorded four-part audio tracks from the digital audio recorder and mixes the reproduced audio signals into two-track tone data while controlling the level of each part. In related-art techniques, the tone data distributed through the Internet is also recorded to a CD (Compact Disk), an MD (Mini Dick), and so to be mixed down into stereo signals as with the tone data for sale.

Further, as the music distribution service based on digital audio data has been gaining popularity, users skilled in tone creation such as music composition and arrangement for example have come to make new demands that they not only listen to the music in a finished form after mix down, but also extracts a desired part from among a plurality of parts of music for listening, edit the extracted part, and add a new part for example that it is difficult with the uneditable tone data after mix down.

For example, in the above-mentioned tone data composed of drums, base, piano, and vocal, the pianist may demand that the piano part be extracted from the tone data for listening or editing. However, as described above, it is difficult to take the tone data consisting of piano data out of the mixed-down tone data.

Consequently, a method of independently managing tracks in tone data made up of a plurality of tracks, attaching copyright information to each track, and distribute the resultant tone data has been described in Japanese Patent Laid-open No. 2001-229281.

The above-mentioned proposed method allows the user to extract only desired parts (the piano part for example) from music for listening or editing and, on the basis of the copyright information about the part used by the user, properly execute the protection of the copyright of music including charging processing for example.

On the other hand, as with flea markets and affiliate services based on the Internet, chances are recently increasing in which users themselves do business by use of networks, selling content such as tone data created by users themselves through networks, for example.

Consequently, for example, demands are increasing for users skilled in music editing like club DJs to use the technique disclosed in Japanese Patent Laid-open No. 2001-229281 to collect material audio data as a multiple-track audio data, mix down (or remix) the multiple-track audio data by themselves, and distribute the remixed tone data via the Web.

However, the distribution (or sale) of remixed music requires the permission by the copyright holder of the music concerned. For example, if a user adds a tone to the piano part of a particular piece of music, the piece of work (or music) thus edited becomes a secondary product of the original that is the piano part. In this case, the copyright holder of the secondary work is the user but, at the same time, the performer of that piano part also becomes the copyright holder of the edited work. Namely, the remixed work is of the user and the copyright holder of the original work equally has the right for the secondary work (or the remixed new work).

Related-art techniques presents a problem of the difficulty of properly managing the copyright of remixed music, secondary copyrighted work and, at the same time, a problem of the difficulty of properly protect the copyright of the original copyrighted work in the remixed music.

SUMMARY

The present invention addresses the above-identified and other problems associated with related-art methods and apparatuses and is intended to provide an information processing apparatus and method, a computer program, and a recording medium for properly protecting the copyright of content such as music that is secondary work and the copyright of the original included in the secondary work.

According to an embodiment, there is provided an information processing apparatus including: a first generating section for editing tone data made up of a plurality of tracks, on the basis of an operation by a user, by using each data of the plurality of tracks, to generate tone data made up of the smaller number of tracks, the tone data being secondary copyrighted work with the tone data made up of the plurality of tracks being original copyrighted work; a second generating section for generating a use information track describing information which describing how data of each track of the tone data of the original copyrighted work is used in the tone data generated by the first generating section; and a setting section for setting first copyright information with a user who edited tone data of original copyrighted work specified as a copyright holder to the tone data generated by the first generating section and data of the use information track generated by the second generating section.

In the above-mentioned information processing apparatus, second copyright information is set to each track of the tone data made up of a plurality of tracks that is original copyrighted work, the second copyright information including information about a person who created the track data as a copyright holder.

In the above-mentioned information processing apparatus, at least one of the first copyright information and the second copyright information includes: information about reproduction count limit indicative of the number of times data to which at least one of the first copyright information and the second copyright information is set; and information about a use fee per unit time of data to which at least one of the first copyright information and the second copyright information is set.

In the above-mentioned information processing apparatus, in reproduction of the tone data generated by the first generating section, it is determined whether or not the tone data is permitted for reproduction on the basis of the first copyright information.

In the above-mentioned processing apparatus, the use information track at least includes: information about a period of time in which each data of the plurality of tracks has been used; and the second copyright information corresponding to each of the plurality of tracks.

In the above-mentioned information processing apparatus, in reproduction of the tone data generated by the first generating section, a primary royalty is computed on the basis of the information about a period of time in which each data of the plurality of tracks has been used and the second copyright information; a secondary royalty is computed on the basis of the first copyright information; and charging information for the reproduction of the tone data is generated on the basis of the primary royalty and the secondary royalty.

According to another embodiment thereof, there is provided an information processing method having the steps of: first generating, for editing tone data made up of a plurality of tracks, on the basis of an operation by a user, by using each data of the plurality of tracks, to generate tone data made up of the smaller number of tracks, the tone data being secondary copyrighted work with the tone data made up of the plurality of tracks being original copyrighted work; second generating, for generating a use information track describing information which describing how data of each track of the tone data of the original copyrighted work is used in the tone data generated by the first generating step; and setting, for setting first copyright information with a user who edited tone data of original copyrighted work specified as a copyright holder to the tone data generated by the first generating step and data of the use information track generated by the second generating step.

According to still another embodiment thereof, there is provided a computer program for making a computer execute the steps of: first generating control, for editing tone data made up of a plurality of tracks, on the basis of an operation by a user, by using each data of the plurality of tracks, to control generation of tone data made up of the smaller number of tracks, the tone data being secondary copyrighted work with the tone data made up of the plurality of tracks being original copyrighted work; second generating control, for controlling generation of a use information track describing information which describing how data of each track of the tone data of the original copyrighted work is used in the tone data generated by the first generating control step; and setting control, for controlling setting of first copyright information with a user who edited tone data of original copyrighted work specified as a copyright holder to the tone data generated by the first generating control step and data of the use information track generated by the second generating control step.

According to yet another embodiment thereof, there is provided a recording medium recording a computer program for making a computer execute the steps of: first generating control, for editing tone data made up of a plurality of tracks, on the basis of an operation by a user, by using each data of the plurality of tracks, to control generation of tone data made up of the smaller number of tracks, the tone data being secondary copyrighted work with the tone data made up of the plurality of tracks being original copyrighted work; second generating control, for controlling generation of a use information track describing information which describing how data of each track of the tone data of the original copyrighted work is used in the tone data generated by the first generating control step; and setting control, for controlling setting of first copyright information with a user who edited tone data of original copyrighted work specified as a copyright holder to the tone data generated by the first generating control step and data of the use information track generated by the second generating control step.

In the information processing apparatus and method and a program according to embodiments of the present invention, tone data made up of a plurality of tracks as directed by a user by use of data of each of the plurality of tracks is edited to generate tone data made up of the smaller number of tracks, the tone data being secondary copyrighted work with the tone data made up of the plurality of tracks being original copyrighted work; a use information track is generated that describes how data of each track of the tone data of the original copyrighted work is used in the above-generated tone data; and first copyright information with a user who edited tone data of original copyrighted work specified as a copyright holder is set to the above-generated tone data and data of the above-generated use information track.

As described and according to embodiments of the invention, the copyright of the content such as music that provides secondary copyrighted work and the copyright of the original copyrighted work for that content may be properly protected.

Additional features and advantages are described herein, and will be apparent from, the following Detailed Description and the figures.

BRIEF DESCRIPTION OF THE FIGURES

FIG. 5 is a schematic diagram illustrating an exemplary configuration of copyright information.

FIG. 15 is a block diagram illustrating an exemplary configuration of a computer.

DETAILED DESCRIPTION

The present invention relates to an information processing apparatus and method, a program, and a recording medium and, more particularly, to an information processing apparatus and method, a program, and a recording medium that are adapted to properly protect the copyright of content including music tones providing secondary copyrighted work and the copyright of the original copyrighted work of that content. This invention will be described in further detail by way of example with reference to the accompanying drawings.

Figure 6:
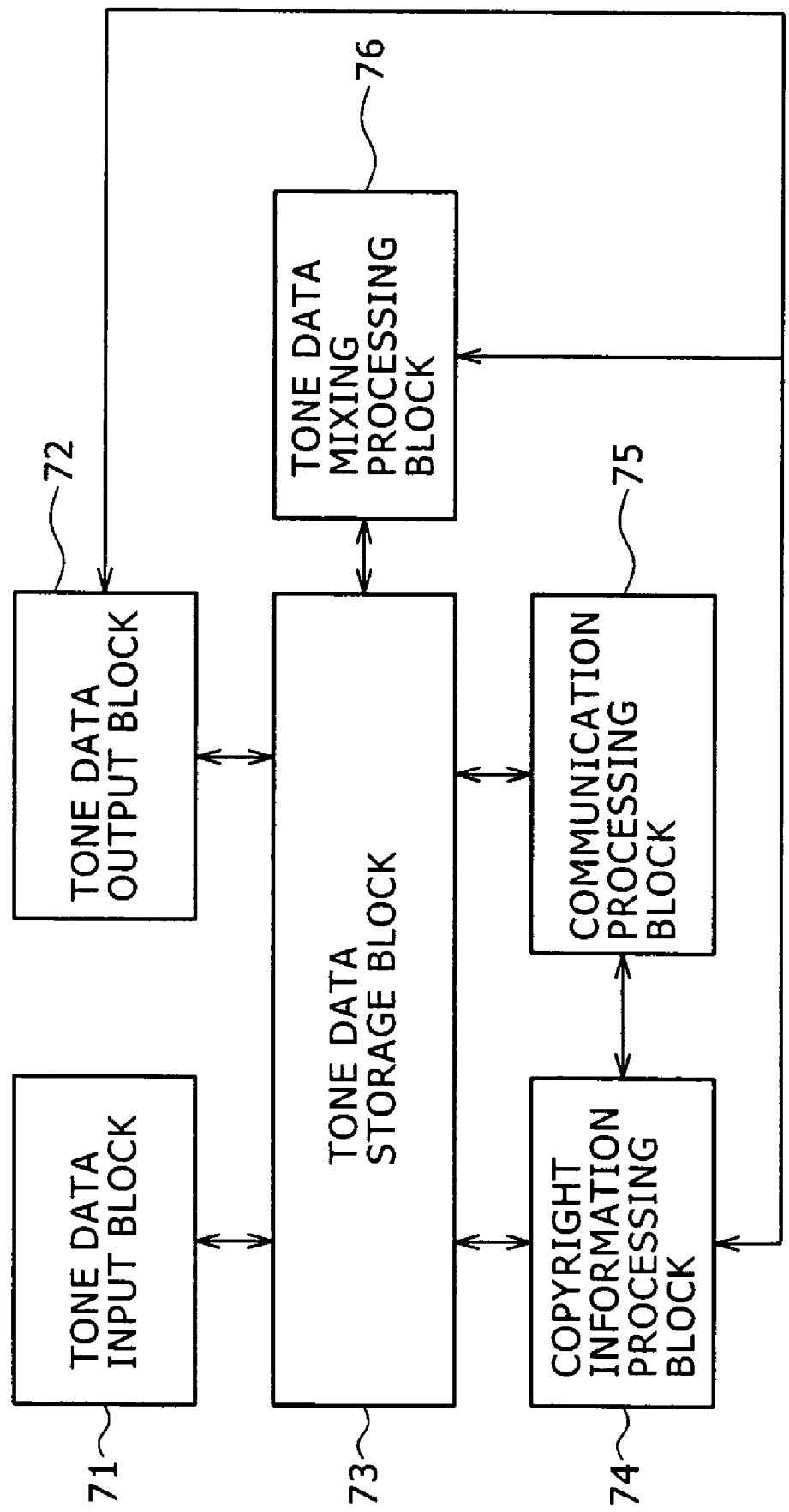
FIG. 6 is a block diagram illustrating an exemplary internal configuration of an editing unit arranged in the music using system shown in FIG. 1.
Figure 7:
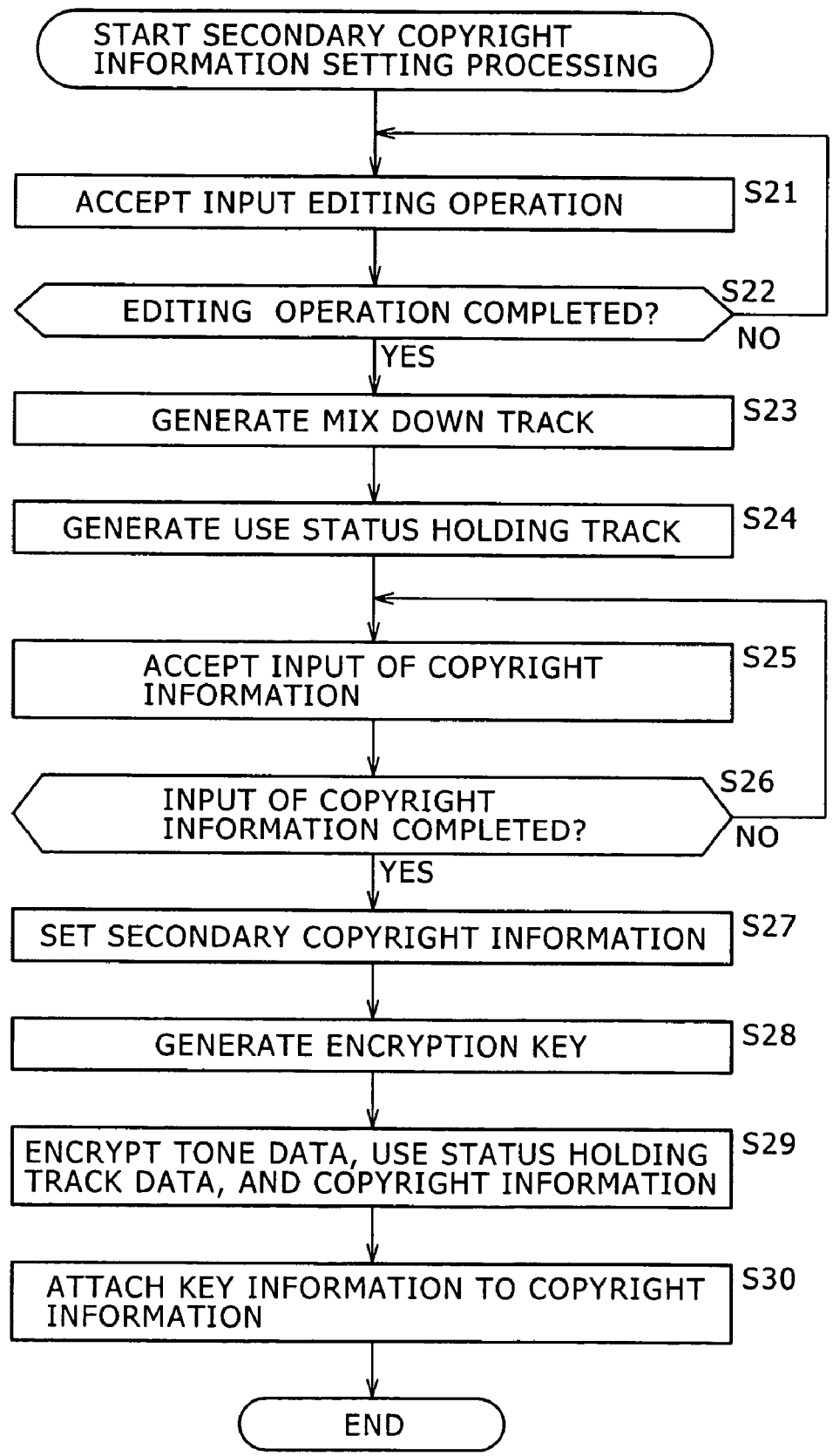
FIG. 7 is a flowchart indicative of secondary copyright information setting processing.

An information processing apparatus according to an embodiment has a first generating section (for example, a tone data mixing processing block 76 shown in FIG. 6 for executing the processing of step S23 shown in FIG. 7) editing tone data (for example, multitrack tone data shown in FIG. 4) made up of a plurality of tracks as directed by a user (for example, a user skilled in music editing) by use of data of each of the plurality of tracks to generate tone data made up of the smaller number of tracks (for example, track L and track R shown in FIG. 8), the tone data being secondary copyrighted work with the tone data made up of the plurality of tracks being original copyrighted work; a second generating section (for example, tone data mixing processing block 76 shown in FIG. 6 for executing the processing of step S24 shown in FIG. 7) generating a use information track (for example, a use status holding track shown in FIG. 8) describing how data of each track of the tone data of the original copyrighted work is used in the tone data generated by the first generating section; and setting section (for example, a copyright information processing block 74 shown in FIG. 6 for executing the processing of step S27 shown in FIG. 7) for setting first copyright information (for example, secondary copyright information shown in FIG. 8) with a user who edited tone data of original copyrighted work specified as a copyright holder to the tone data generated by the first generating section and data of the use information track generated by the second generating section.

Figure 4:
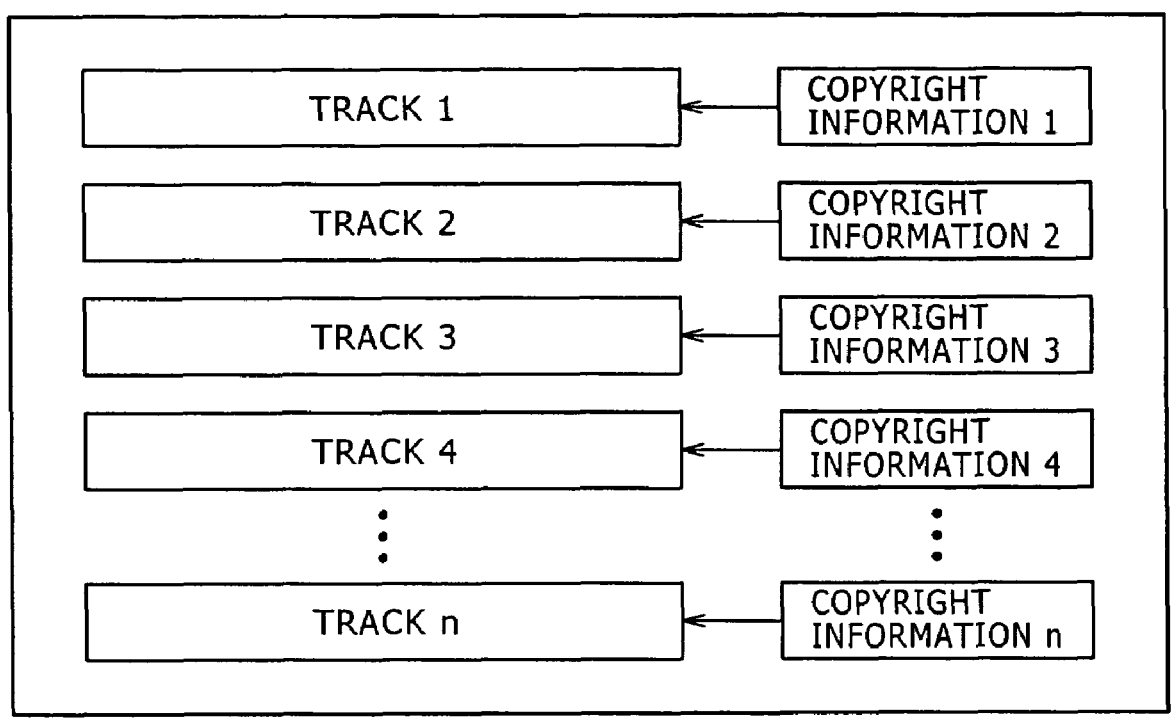
FIG. 4 is a schematic diagram illustrating the correlation between track data and primary copyright information.

In the information processing apparatus according to an embodiment, second copyright information is set to each of the plurality of tracks of the tone data that is original copyrighted work, the second copyright information (for example, copyright information 1 through copyright information n shown in FIG. 4) including information about a person (for example, a performer) who created the track data as a copyright holder.

In the information processing apparatus according to an embodiment, at least one of the first copyright information and the second copyright information at least includes information (for example, reproduction count limit shown in FIG. 5) about reproduction count limit indicative of the number of times data to which at least one of the first copyright information and the second copyright information is set; and information (for example, use fee shown in FIG. 5) about a use fee per unit time of data to which at least one of the first copyright information and the second copyright information is set.

In the information processing apparatus according to an embodiment, in reproduction of the tone data generated by the first generating section, it is determined (by the processing of step S55 shown in FIG. 11, for example) whether or not the tone data is permitted for reproduction on the basis of the first copyright information.

Figure 9:
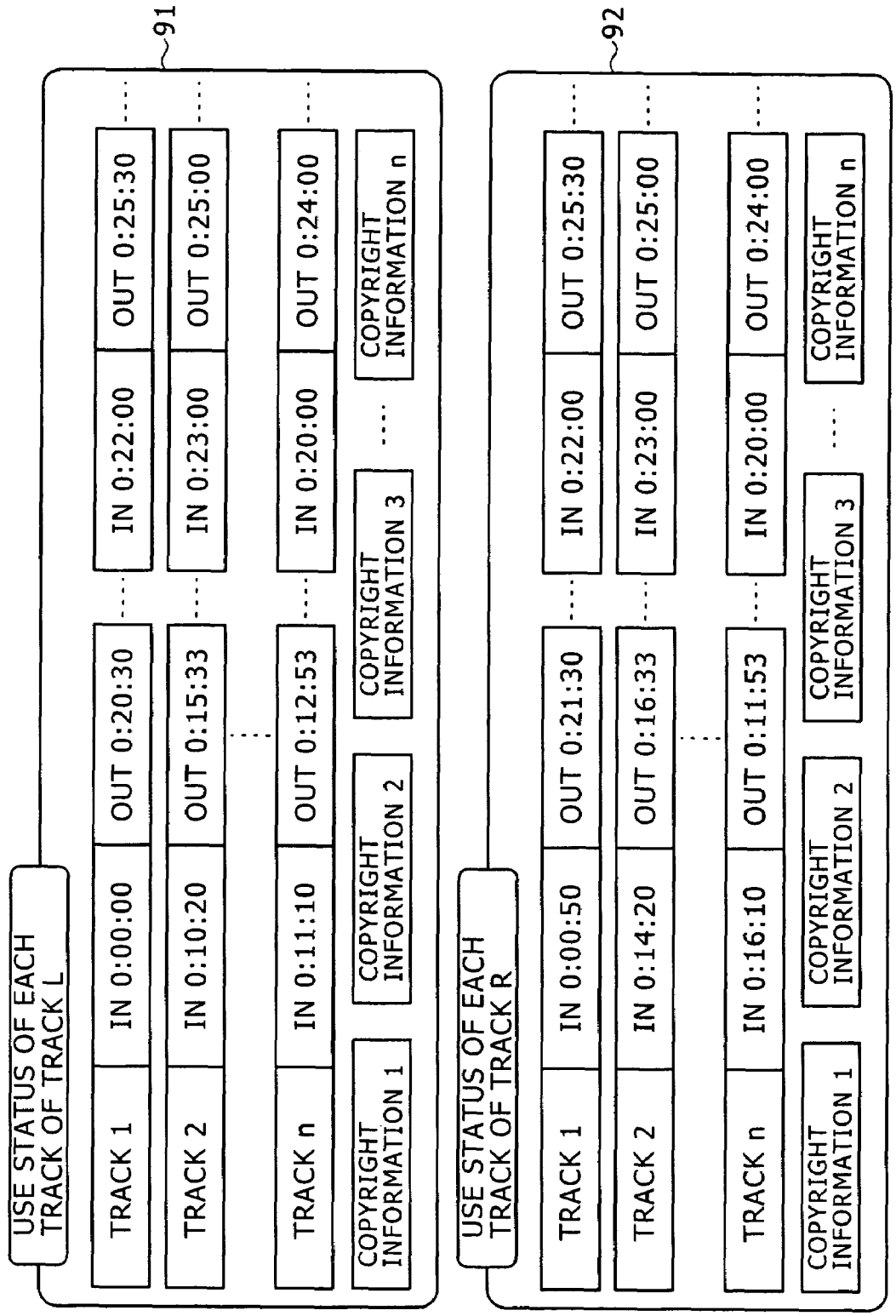
FIG. 9 is a schematic diagram illustrating an exemplary configuration of use status holding tracks.

In the processing apparatus according to claim 5, the use information track at least includes information (for example, data defined by a combination of "IN" and "OUT" shown in FIG. 9) about a period of time in which data of each of the plurality of tracks has been used; and the second copyright information (for example, copyright information 1 through copyright information n shown in FIG. 9) corresponding to each of the plurality of tracks.

In the information processing apparatus according to an embodiment, in reproduction of the tone data generated by the first generating section, a primary royalty is computed (by the processing of step S139 shown in FIG. 14, for example) on the basis of the information about a period of time in which data of each of the plurality of tracks has been used and the second copyright information; a secondary royalty is computed (by the processing of step S141 shown in FIG. 14, for example) on the basis of the first copyright information; and charging information for the reproduction of the tone data is generated (by the processing of step S142 shown in FIG. 14, for example) on the basis of the primary royalty and the secondary royalty.

An information processing method according to an embodiment, includes the steps of editing tone data (for example, multitrack tone data shown in FIG. 4) made up of a plurality of tracks as directed by a user (for example, a user skilled in editing of music) by use of data of each of the plurality of tracks to generate (for example, step S23 shown in FIG. 7) tone data made up of the smaller number of tracks (for example, track L and track R), the tone data being secondary copyrighted work with the tone data made up of the plurality of tracks being original copyrighted work; generating (for example, the processing of step 24 shown in FIG. 7) a use information track (for example, a use status holding track shown in FIG. 8) describing how data of each track of the tone data of the original copyrighted work is used in the tone data generated in the first generating step; and setting (for example, the processing of step S27 shown in FIG. 7) first copyright information (for example, secondary copyright information shown in FIG. 8) with a user who edited tone data of original copyrighted work specified as a copyright holder to the tone data generated in the first generating step and data of the use information track generated in the second generating step.

A computer program, according to an embodiment for making a computer execute includes the steps of editing tone data (for example, multitrack tone data shown in FIG. 4) made up of a plurality of tracks as directed by a user (for example, a user skilled in editing of music) by use of data of each of the plurality of tracks to generate (for example, step S23 shown in FIG. 7) tone data made up of the smaller number of tracks (for example, track L and track R in FIG. 8), the tone data being secondary copyrighted work with the tone data made up of the plurality of tracks being original copyrighted work; controlling generating (for example, the processing of step 24 shown in FIG. 7) of a use information track (for example, a use status holding track shown in FIG. 8) describing how data of each track of the tone data of the original copyrighted work is used in the tone data generated in the first generating control step; and controlling setting (for example, the processing of step S27 shown in FIG. 7) of first copyright information (for example, secondary copyright information shown in FIG. 8) with a user who edited tone data of original copyrighted work specified as a copyright holder to the tone data generated in the first generating control step and data of the use information track generated in the second generating control step.

A recording medium recording a computer program, according to an embodiment, for making a computer execute includes the steps of editing tone data (for example, multitrack tone data shown in FIG. 4) made up of a plurality of tracks as directed by a user (for example, a user skilled in editing of music) by use of data of each of the plurality of tracks to generate (for example, step S23 shown in FIG. 7) tone data made up of the smaller number of tracks (for example, track L and track R in FIG. 8), the tone data being secondary copyrighted work with the tone data made up of the plurality of tracks being original copyrighted work; controlling generating (for example, the processing of step 24 shown in FIG. 7) of a use information track (for example, a use status holding track shown in FIG. 8) describing how data of each track of the tone data of the original copyrighted work is used in the tone data generated in the first generating control step; and controlling setting (for example, the processing of step S27 shown in FIG. 7) of first copyright information (for example, secondary copyright information shown in FIG. 8) with a user who edited tone data of original copyrighted work specified as a copyright holder to the tone data generated in the first generating step and data of the use information track generated in the second generating step.

Figure 1:
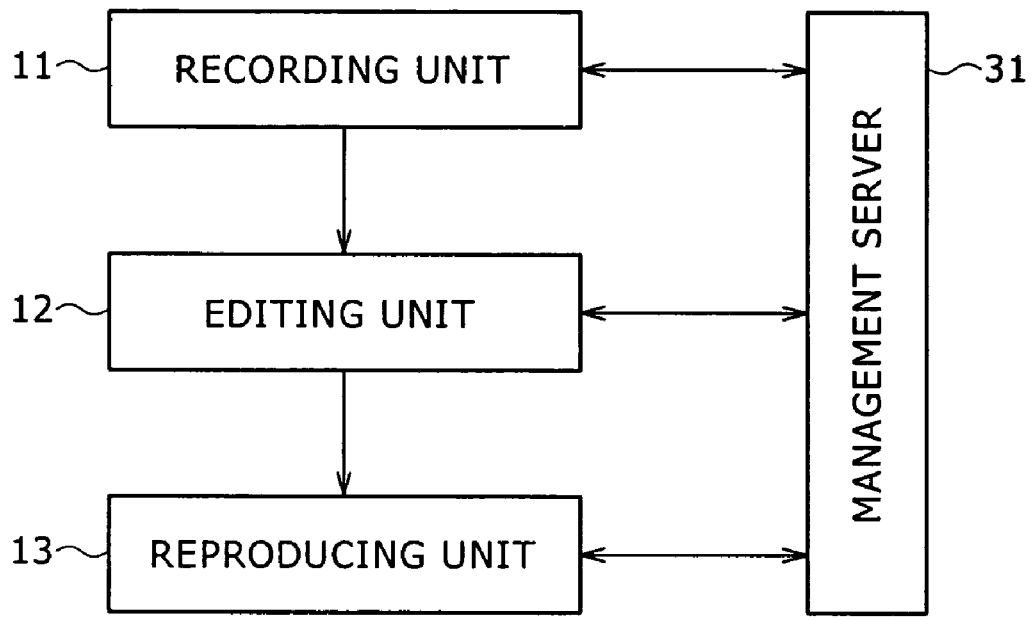
FIG. 1 is a block diagram illustrating a music using system according to an embodiment.

The following describes embodiments of the present invention with reference to accompanying drawings. Now, referring to FIG. 1, there is shown a music using system practiced as one embodiment of the invention. In the figure, a recording unit 11 accepts the input of tone data of each track to generate tone data of a plurality of tracks (hereafter referred to as multitrack tone data). At this moment, the recording unit 11 attaches, to the generated multitrack tone data, track by track, primary copyright information in which the creator (the performer, for example) of that track is the copyright holder.

An editing unit 12 edits the tone data generated by the recording unit 11; to be more specific, the editing unit 12 acquires a plurality of pieces of multitrack tone data to generate new multitrack tone from the obtained multitrack tone data by combining desired tracks, for example. The editing unit 12 then reproduces the generated multitrack tone data to mix down the data of each track into a two-channel (or two-track) stereo signal like the tone data recorded to CDs or MDs for sale. Namely, the user is able to remix tones by use of the editing unit 12.

Also, for the tone data to be mixed down, the editing unit 12 generates the data that includes the primary copyright information of the data (the data of each track) providing material and attaches the secondary copyright information in which the user (the mixer or DJ, for example) who edited the tone data is the copyright holder.

A reproducing unit 13 acquires the tone data edited (or mixed down) by the editing unit 12 to reproduce the obtained tone data and transmits primary copyright information and secondary copyright information to a management server 31.

The management server 31 stores the information about copyright information in an aggregate manner and communicates with the recording unit 11, the editing unit 12, and the reproducing unit 13, thereby providing the information about copyright as required. It is also practicable to store tone data in the management server 31 as required.

Further, on the basis of the primary copyright information and secondary copyright information received from the reproducing unit 13, the management server 31 determines to permit or not permit the reproduction of the tone data, thereby executing the generation of charging data for example. Also, the management server 31 transmits the generated charging information to the user and an account settlement server, not shown, for example, thereby controlling the execution of charging processing for the use of tone data.

The recording unit 11, the editing unit 12, and the reproducing unit 13 have each a communication capability for communicating with each other and with the management server 31. The recording unit 11, the editing unit 12, and reproducing unit 13 may be accommodated in one unit (or housing) or configured as standalone units.

The recording unit 11, the editing unit 12, and the management server 31 may be interconnected through a network such as the Internet or a LAN (Local Area Network) or with dedicated cables for example.

The present example is supposed that a performer such as a professional musician provide multitrack tone data by use of the recording unit 11 arranged in a studio and a user owning the editing unit 12 and versed in the editing of music like a club DJ acquire the above-mentioned multitrack tone data via a network, thereby remixing the music of the obtained tone data. It is also supposed that each general user have the reproducing unit 13 to listen to music by use of the reproducing unit 13 by acquiring the remixed tone data generated by a desired club DJ via a network for example.

It should be noted that, in the present example, the remix tone data becomes secondary copyrighted work based on the multitrack tone data generated by use of the recording unit 11, in which the copyright holder of the original copyrighted work is the above-mentioned performer and the copyright holder of the secondary copyrighted work is the above-mentioned club DJ. The copyright information of the original copyrighted work corresponds to the above-mentioned primary copyright information and the copyright information of the secondary copyrighted work corresponds to the above-mentioned secondary copyright information.

Figure 2:
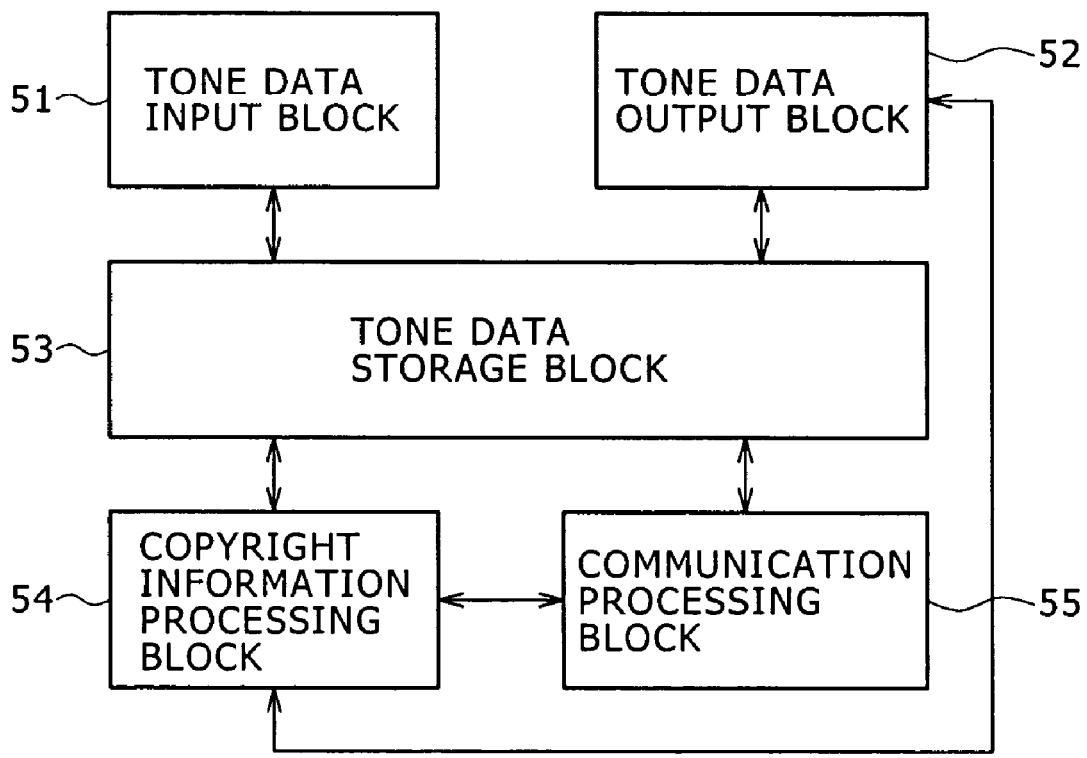
FIG. 2 is a block diagram illustrating an exemplary internal configuration of a recording unit arranged in the music using system illustrated in FIG. 1.

Referring to FIG. 2, there is shown a block diagram of an exemplary configuration of the recording unit 11. In the figure, a tone data input block 51 converts a tone inputted through an input device such as a microphone into digital data and outputs the digital data to a tone data storage block 53. The tone data storage block 53 is made up of a HDD (Hard Disk Drive) for example, storing the tone data supplied from the tone data input block 51, on a track basis.

A tone data output block 52 displays or reproduces the tone data stored in the tone data storage block 53, as required.

A copyright information processing block 54 accepts the input of the copyright information corresponding to the data of each track and relates the accepted copyright information with the data of each track, attaching the copyright information as primary copyright information. In addition, the copyright information processing block 54 generates a key for encrypting the data of each track in a predetermined encryption algorithm for example and encrypts the data of each track and the primary copyright information, thereby making both the encrypted track data and the encrypted primary copyright information inseparable from each other.

A communication block 55 supports the communication with the editing unit 12, the management server 31, and other devices through a network or a cable.

Figure 3:
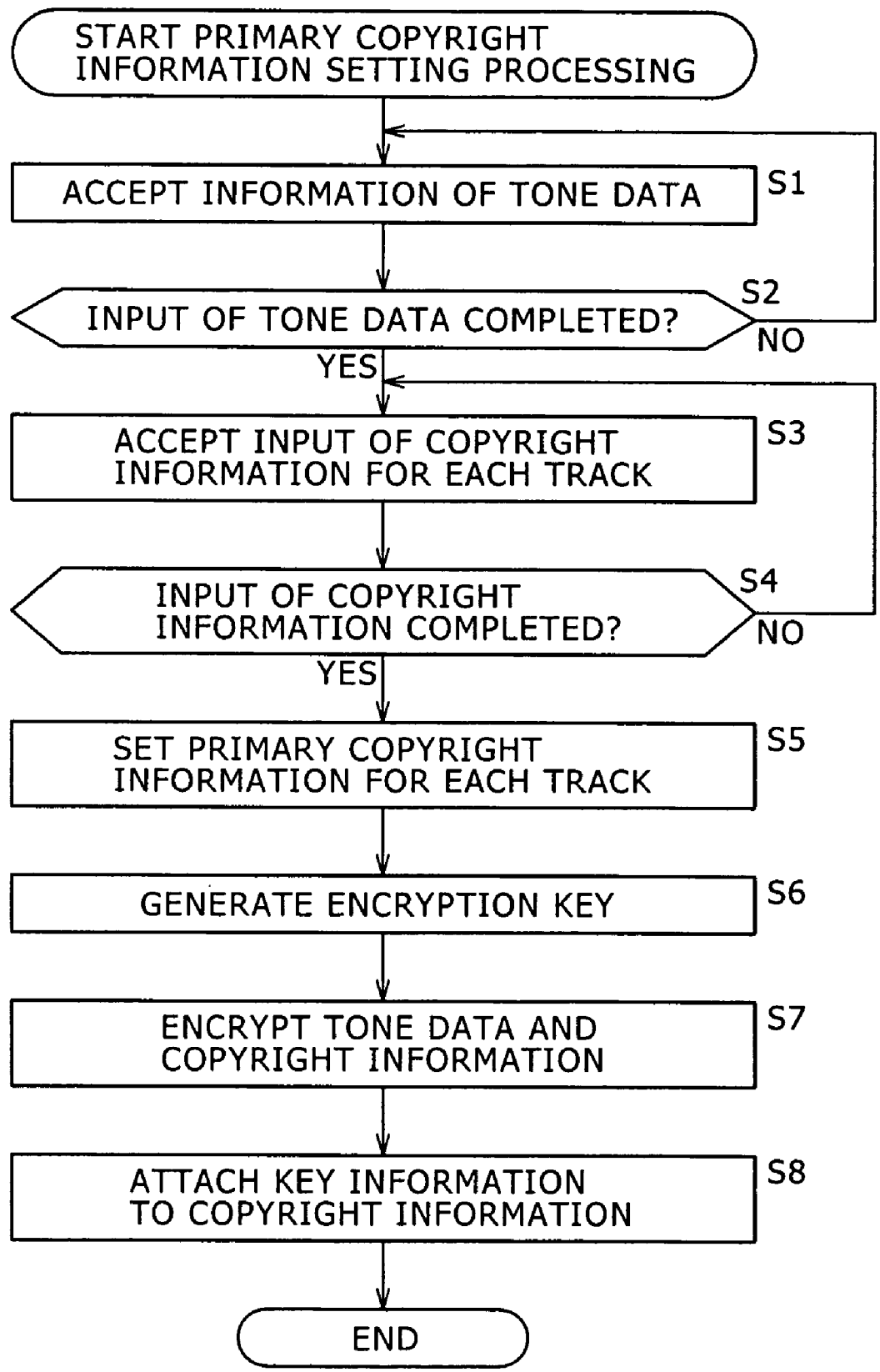
FIG. 3 is a flowchart indicative of primary copyright information setting processing.

Now, referring to a flowchart shown in FIG. 3, primary copyright information setting processing to be executed by the recording unit 11 will be described.

In step S1, the tone data input block 51 accepts the input of tone data (the data based on an inputted tone). In step S2, the tone data input block 51 determines whether or not the input of the tone data has completed. If the input of the tone data is found not completed, then the procedure returns to step S1.

If the input of the tone data is found completed in step S2, then the procedure goes to step S3. At this moment, the tone data is stored in the tone data storage block 53 as the data of one (or more) tracks.

In step S3, the copyright information processing block 54 accepts the input of the copyright information for each track for the data of each track stored in the tone data storage block 53. At this moment, the copyright information is entered by the copyright holder (the performer, for example) of that tone data.

In step S5, the copyright information processing block 54 sets primary copyright information to each track on the basis of the copyright information of which input has been accepted the processing of step S3. Consequently, the primary copyright information is set as shown in FIG. 4.

Referring to FIG. 4, there is shown an example of the relationship between tracks and copyright information. Copyright information 1 is the copyright information of which holder is the performer of the tone corresponding to the data of track 1.

Likewise, copyright information 2 through copyright information n are related with track 2 through track n respectively. Copyright information 2 through copyright information n provide copyright information of which holders are performers of the tones corresponding to the data of track 2 through track n.

Referring to FIG. 5, there is shown an exemplary configuration of copyright information. In this example, copyright information is made up "copyright holder ID", "fee", "reproduction count limit", "copy count limit", "expiration date", and other items.

Item "copyright holder ID" identifies the copyright holder of the data of that track. This item is actually a number that uniquely identifies a copyright holder, for example, "0001" in this example.

Item "fee" is a fee for the use, reproduction for example, of the data of that track in unit of time, a price (in yen for example) per second for example. In this example, the fee is charged on a one yen per second basis.

Item "reproduction count limit" is indicative of the number of times the data of that track may be reproduced, "10 times" in this example.

Item "copy count limit" is indicative of the number of times the data of that track may be copied, "3 times" in this example.

Tone data is protected in copyright by a content copyright protection system, such as DRM (Digital Right Management). The reproduction count limit and copy count limit of each piece of tone data are set on the basis of the copyright management system used.

Item "expiration date" is indicative of the valid period of this copyright information, "2005 Dec. 31" in this example.

For other information, the information for restricting a remix method is set for example.

Returning to FIG. 4, copyright information 1 through copyright information n thus configured are set (or attached) as related with the data of track 1 through track n as the primary copyright information.

Returning to FIG. 3, after the processing of step S5, the copyright information processing block 54 generates, in step S6, a key (en encryption) for encrypting the data of each track in a predetermined encryption algorithm. In step S7, copyright information processing block 54 encrypts the tone data of each track and the copyright information related with that track by use of the encryption key generated in step S6. Consequently, the track data and the copyright information become inseparable from each other. It should be noted that, instead of encrypting the tone data of a track and the copyright information related with that track, a message digest generated on the basis of the copyright information for example may be attached to the track data, thereby making both the track data and the copyright information inseparable. The point is that any means may be taken to prevent the copyright information from being altered.

In step S8, the copyright information processing block 54 attaches the key information to the copyright information (or the header of each track) and stores the key information and the copyright information into the tone data storage block 53.

As described above, the primary copyright information is set to the data of each track making up tone data. Besides, the multitrack tone data to which the primary copyright information is set is also provided to other users (a user owning the editing unit 12 for example) via a network or the management server 31 for example.

Referring to FIG. 6, there is shown a block diagram illustrating an exemplary internal configuration of the editing unit 12. In the figure, a tone data input block 71 converts a tone entered from an input device such as a microphone into digital data and acquires tone data from a recording medium such as CD or MD, outputting the digital tone data and the tone data read from the recording medium to a tone data storage block 73. The tone data storage block 73, made up of a HDD for example, stores, on a track basis, the tone data supplied from the tone data input block 71 or the tone data obtained via the head 75.

A tone data output block 72 displays or reproduces tone data stored in the tone data storage block 53, as required.

A tone data mixing processing block 76 executes editing processing such as remixing music of multitrack tone data stored in the tone data storage block 73, for example. Music remixing is executed by extracting only desired portions (or times) of the data of a desired track in multitrack tone data to combine extracted portions, thereby mixing the multitrack tone data down to the data of two-channel (or two-track) stereo signals.

Then, the tone data mixing processing block 76 stores the remixed tone data into the tone data storage block 73. At this moment, the tone data to be stored is attached with the data use status of tracks used in the process of remixing and a use status holding track having the primary copyright information corresponding to these tracks. It should be noted that the use status holding track will be described later with reference to FIGS. 8 through 10.

A copyright information processing block 74 attaches secondary copyright information that is inputted as related with the tone data remixed by the tone data mixing processing block 76. Also, the copyright information processing block 54 generates a key for encrypting the remixed tone data in a predetermined encryption algorithm for example and encrypts the remixed tone data and the secondary copyright information by use of the generated key, thereby making both the tone data and the secondary copyright information inseparable.

A communication processing block 75 communicates with the recording unit 11, reproducing unit 13, and management server 31 for example via a network or a cable.

The following describes secondary copyright information setting processing to be executed by the editing unit 12 with reference to the flowchart shown in FIG. 7.

In step S21, the tone data mixing processing block 76 accepts the input of an editing operation. At this moment, the input of editing operation for remixing music is accepted as described above.

In step S22, the tone data mixing processing block 76 determines whether or not the editing operation has been completed. If the editing operation is found not yet completed, the procedure returns to step S21. If the end of editing has been directed by the user by executing an operation for the end on an operator block, not shown, for example, then it is determined in step S22 that the editing operation has been completed, upon which the procedure goes to step S23.

In step S23, the tone data mixing processing block 76 generates mix down tracks in which multitrack tone data is mixed down onto two tracks corresponding to the stereo signals of two right and left channels, for example.

In step S24, the tone data mixing processing block 76 generates a use status holding track.

In step S25, the copyright information processing block 74 accepts the input of copyright information. In step S26, the copyright information processing block 74 determines whether the input of the copyright information has been completed or not. If the input of the copyright information is found not yet completed, then the procedure returns to step S25. If the input of the copyright information is found completed in step S26, then the procedure goes to step S27. At this moment, the input of the copyright information is executed by the copyright holder (the club DJ who has executed the editing operation, for example) of the mixed-down tone data.

In step S27, the copyright information processing block 74 sets the secondary copyright information to the remixed two-track tone data on the basis of the copyright information of which input has been accepted in step S25.

Figure 8:
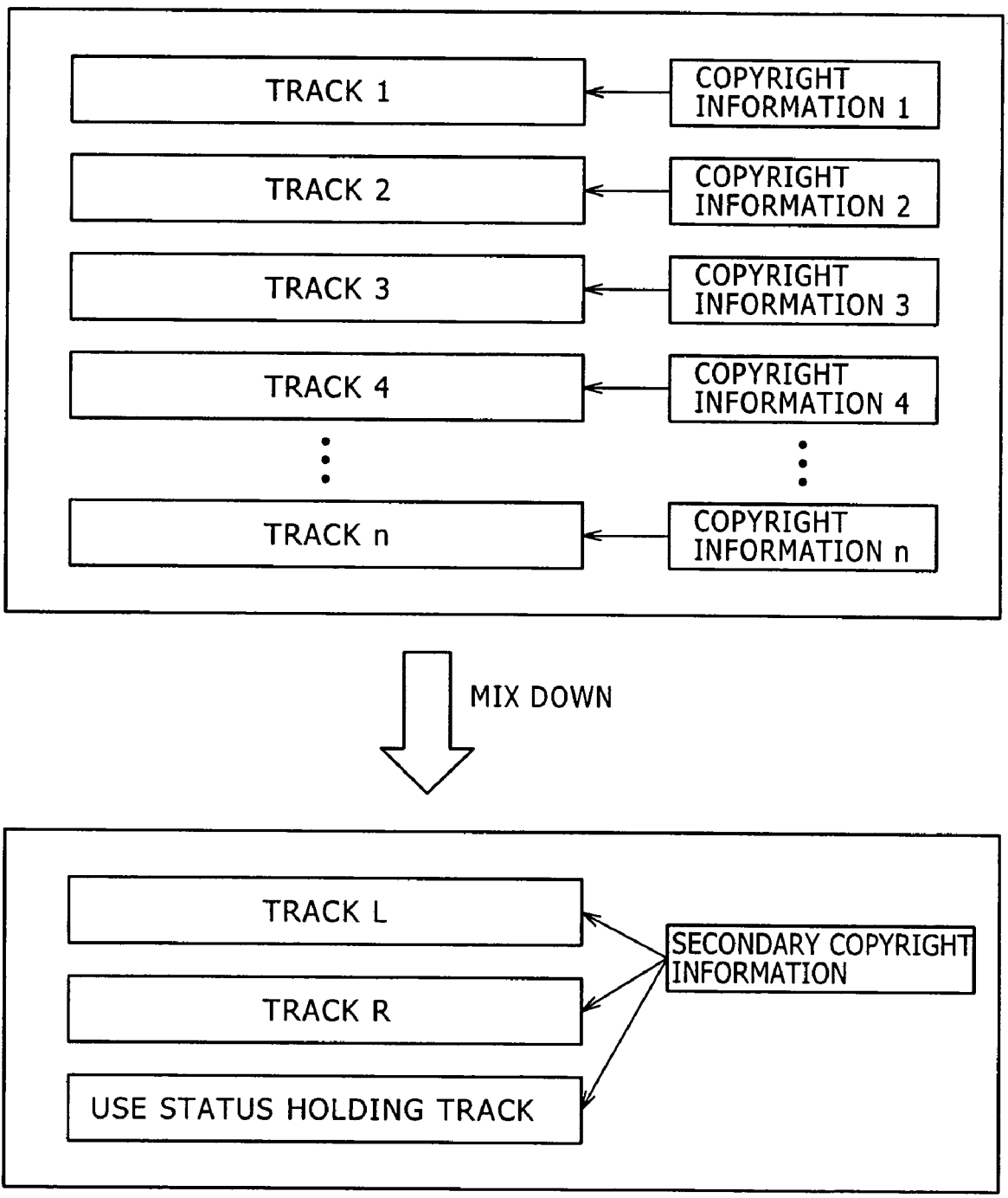
FIG. 8 is a schematic diagram illustrating exemplary tone data that is mixed down.
Figure 10:
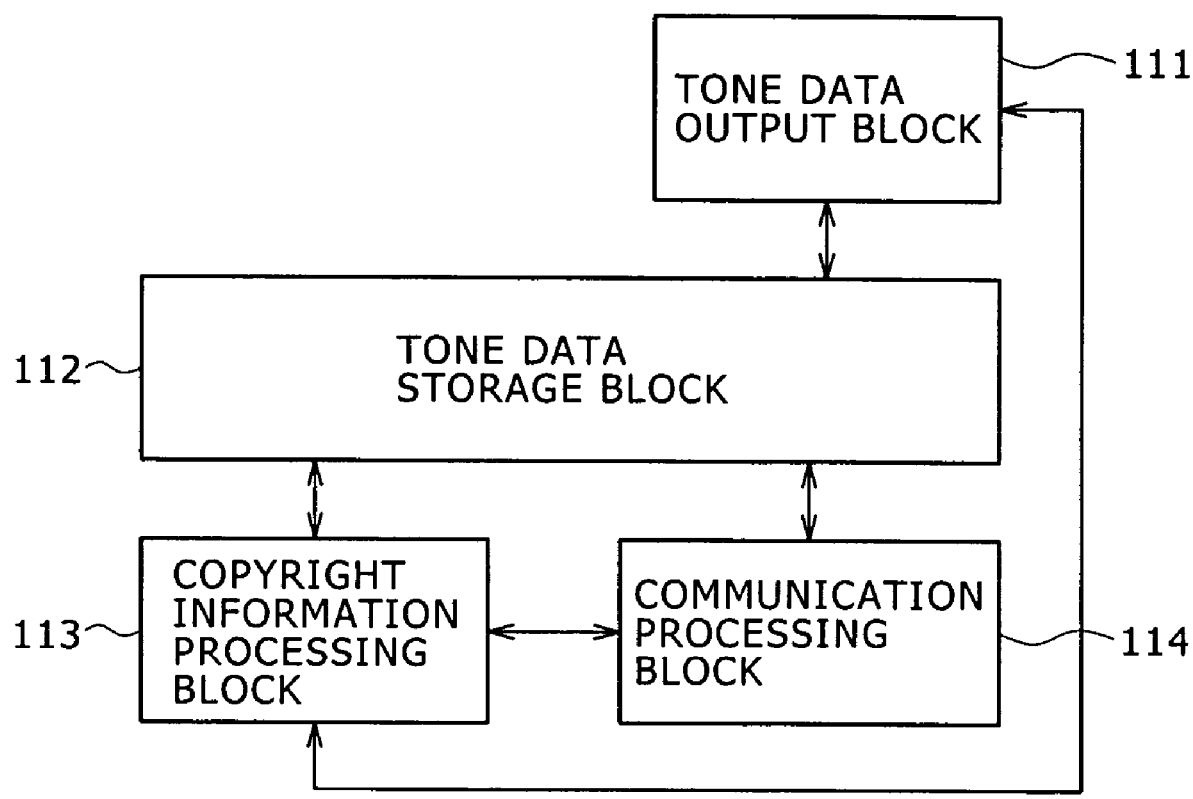
FIG. 10 is a block diagram illustrating an exemplary internal configuration of a reproduction unit arranged in the music using system shown in FIG. 1.

The following will detail the above-mentioned processing with reference to FIGS. 8 through 10. FIG. 8 shows an example in which multitrack tone data is mixed down onto two-track tone data. In this example, the multitrack tone data made up of track 1 through track n is mixed down onto the tone data made up of two tracks (or mixed-down tracks) of a track (or track L) corresponding to the left-side signal of two-channel stereo signals and a track (or track R) of the data corresponding to the right-side signal (step S23). It should be noted that copyright information 1 through copyright information n are set to the data of track 1 through track n as corresponding primary copyright information.

Then, for the tone data of the two tracks, the above-mentioned use status holding track is generated (step S24) and the secondary copyright information is set (step S27). Namely, as shown in FIG. 8, if multitrack tone data is mixed down onto two-track tone data, the secondary copyright information is set to the mixed-down two-track data and the use status holding track and the copyright information set to each track of the multitrack tone data to be mixed down comes to be included in the use status holding track. It should be noted that the secondary copyright information is configured in the same manner as described above with reference to FIG. 5.

The use status holding track is configured as shown in FIG. 9, for example. In this example, the use status holding track is made up of track use status 91 of track L and track use status 92 of track R.

Each track use status 91 of track L records the use status of track 1 through track n. As the use status of track 1, "IN0:00:00 OUT0:20:30", . . . "IN0:22:00 OUT0:25:30", . . . are described. This indicates that the data of track 1 is used at the first time during a period of time starting with (0:00:00) and ending with (0:22:30) after 20 minutes 30 seconds from the start time and then is used, at nth time for example, during a period of time starting with (0:22:00) after 22 minutes from the start time and ending with (0:25:30) after 25 minutes 30 seconds from the start time. Namely, the use start and end times of each track are expressed in combinations of "IN" and "OUT".

Each track use status 91 of track L describes use status as with track 1 also with respect to track 2 through track n.

Each track use status 91 of track L includes copyright information 1 through copyright information n that are the primary copyright information of each track. This configuration allows, in the reproduction of track L, the generation of charging information on the basis of the use status of each track and the primary copyright information of each track, thereby executing proper charging processing in accordance with the use status of tone data.

It should be noted that each track use status 92 of track R is also made up of the data indicative of the use status of each track and the primary copyright information of each track as with each track use status 91 of track L.

Referring to FIG. 7 again, in step S28 from step S27, the copyright information processing block 74 generates a key (an encryption key) for encrypting the data of track L, track R, and the use status holding track in a predetermined encryption algorithm. In step S29, the copyright information processing block 74 encrypts the tone data of track L and track R, the data of use status holding track, and the secondary copyright information by use of the key generated in step S28. Consequently, the data of the above-mentioned each track and the secondary copyright information becomes inseparable from each other. It should be noted that, instead of encrypting the track data and the secondary copyright information, a message digest generated on the basis of the secondary copyright information, for example, may be attached to the track data to make the track data and the copyright information inseparable from each other. The point is that any means may be taken to prevent the copyright information from being altered.

In step S30, the copyright information processing block 74 attaches the information about the generated key to the copyright information (or the header of each track for example) and stores this information in the tone data storage block 73.

As described above, the secondary copyright information is set to the remixed tone data. The tone data set with the secondary copyright information is also provided to other users (the of the reproducing unit 13, for example) via a network or the management server 31.

Referring to FIG. 10, there is shown a block diagram illustrating an exemplary internal configuration of the reproducing unit 13. In the figure, a tone data storage block 112 is made up of a HDD of for example and stores, on a track basis, the tone data obtained through a communication block 114, for example.

A tone data output block 111 displays or reproduces tone data stored in the tone data storage block 112, as required.

A copyright information processing block 113 extracts the secondary copyright information and the information of use status holding track from the tone data storage block 112 and transmits the extracted information to the management server 31 via the communication block 114. Also, the copyright information processing block 113 controls the tone data output block 111 on the basis of the information supplied from the management server 31, thereby permitting or rejecting the reproduction of tone data (namely, causing an error).

The communication block 114 communicates with the editing unit 12, the management server 31, and other devices via a network or a cable.

Figure 11:
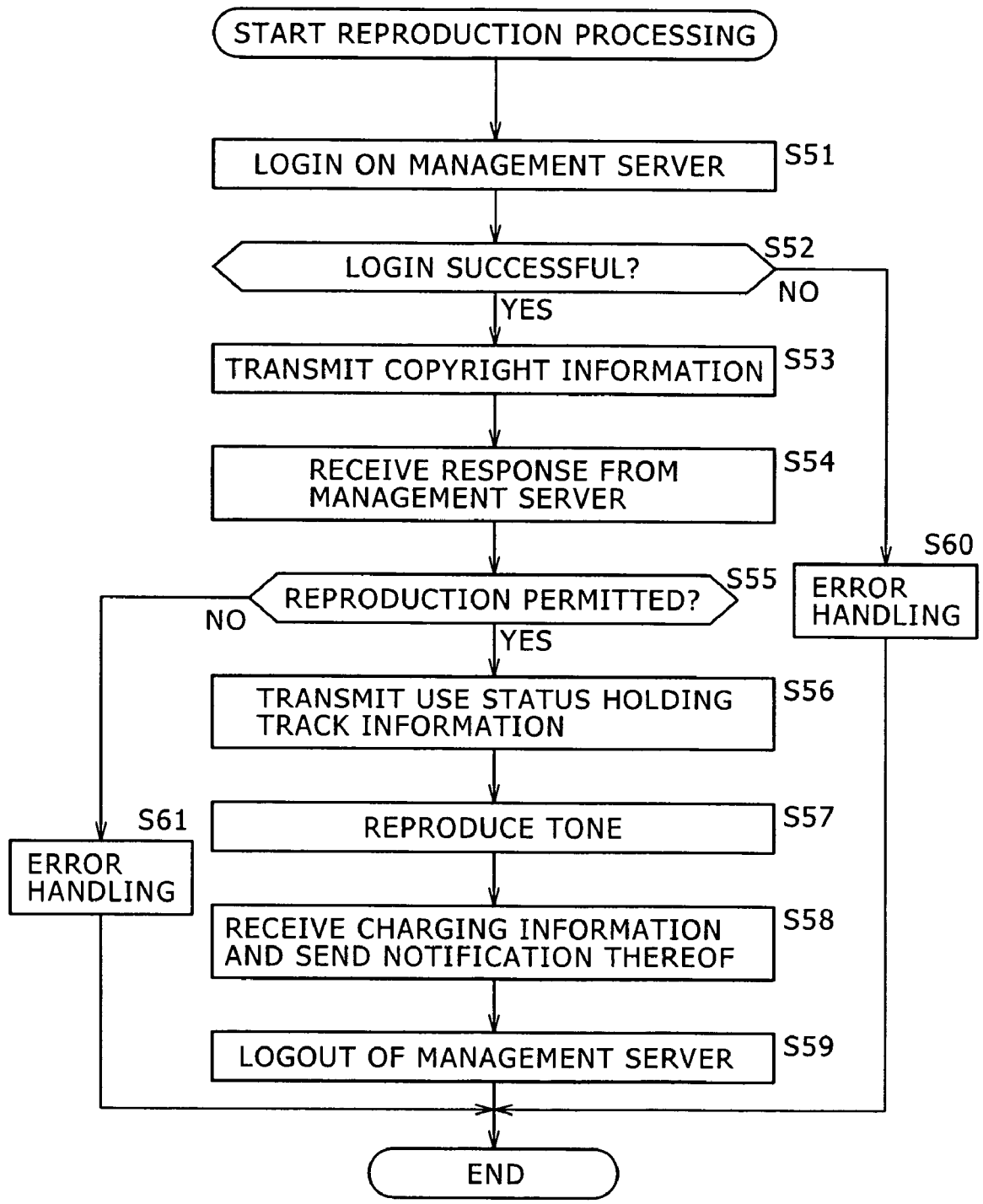
FIG. 11 is a flowchart indicative of reproduction processing.

The following describes the reproduction of tone data by the reproducing unit 13 with reference to a flowchart shown in FIG. 11. In the following example, it is supposed that remixed (or mixed down) tone data as shown in FIG. 8 have been obtained and stored in the tone data storage block 112 by the reproducing unit 13 via a network for example and the reproduction of the stored tone data have been directed by the user of the reproducing unit 13.

In step S51, the communication block 114 logs in on the management server 31 via a network for example. At this moment, an ID and a password necessary for the login operation are transmitted to management server 31. In step S52, the communication block 114 determines whether or not the login on the management server 31 has been successful. If the reproducing unit 13 (or the user thereof) has been successfully authenticated by the management server 31, it indicates that the login has been successful, upon which the procedure goes to step S53. The processing by the management server 31 will be described later with reference to FIG. 12.

In step S53, the copyright information processing block 113 transmits the copyright information of tone data to the management server 31 via the communication block 114. In this step, the encrypted tone data is decrypted by use of the above-mentioned key to extract the secondary copyright information, which is transmitted.

In step S54, the copyright information processing block 113 receives a response from the management server 31 via the communication block 114. At this moment, a decision for permitting or rejecting the reproduction on the basis of the reproduction count limit of the secondary copyright information for example is transmitted from the management server 31.

In step S55, on the basis of the response received from the management server 31 in step S54, the copyright information processing block 113 determines whether or not the reproduction of tone data has been permitted. If the reproduction is found permitted, then the procedure goes to step S56, in which the information of the use status holding track is transmitted to the management server 31.

In step S57, the copyright information processing block 113 controls the tone data output block 111 to reproduce tone data. Consequently, the user is able to listen to remixed music outputted from a speaker for example, not shown.

In step S58, the copyright information processing block 113 receives charging information from the management server 31 via the communication block 114 and displays the received charging information onto a display block, not shown, notifying the user of the charging information.

In step S59, the communication block 114 logs out of the management server 31.

It should be noted that, if the login is found unsuccessful in step S52, then the procedure goes to step S60, in which error handing is executed to end this processing. At this moment, the failure of login is displayed on the management server 31 by means of a display device, not shown, for example, notifying the user thereof.

If the reproduction is found not permitted in step S55, then the procedure goes to step S61, in which error handing is executed to end this processing. At this moment, the rejection of reproduction is displayed by means of a display device, not shown, notifying the user thereof.

Thus, the remixed tone data is reproduced. Because the secondary copyright information and the information of use status holding track are transmitted to the management server 31, even the remixed tone data that becomes secondary copyrighted work may be properly protected in the copyright thereof and the copyright of the original copyrighted work on the basis of the primary copyright information and the secondary copyright information.

Figure 12:
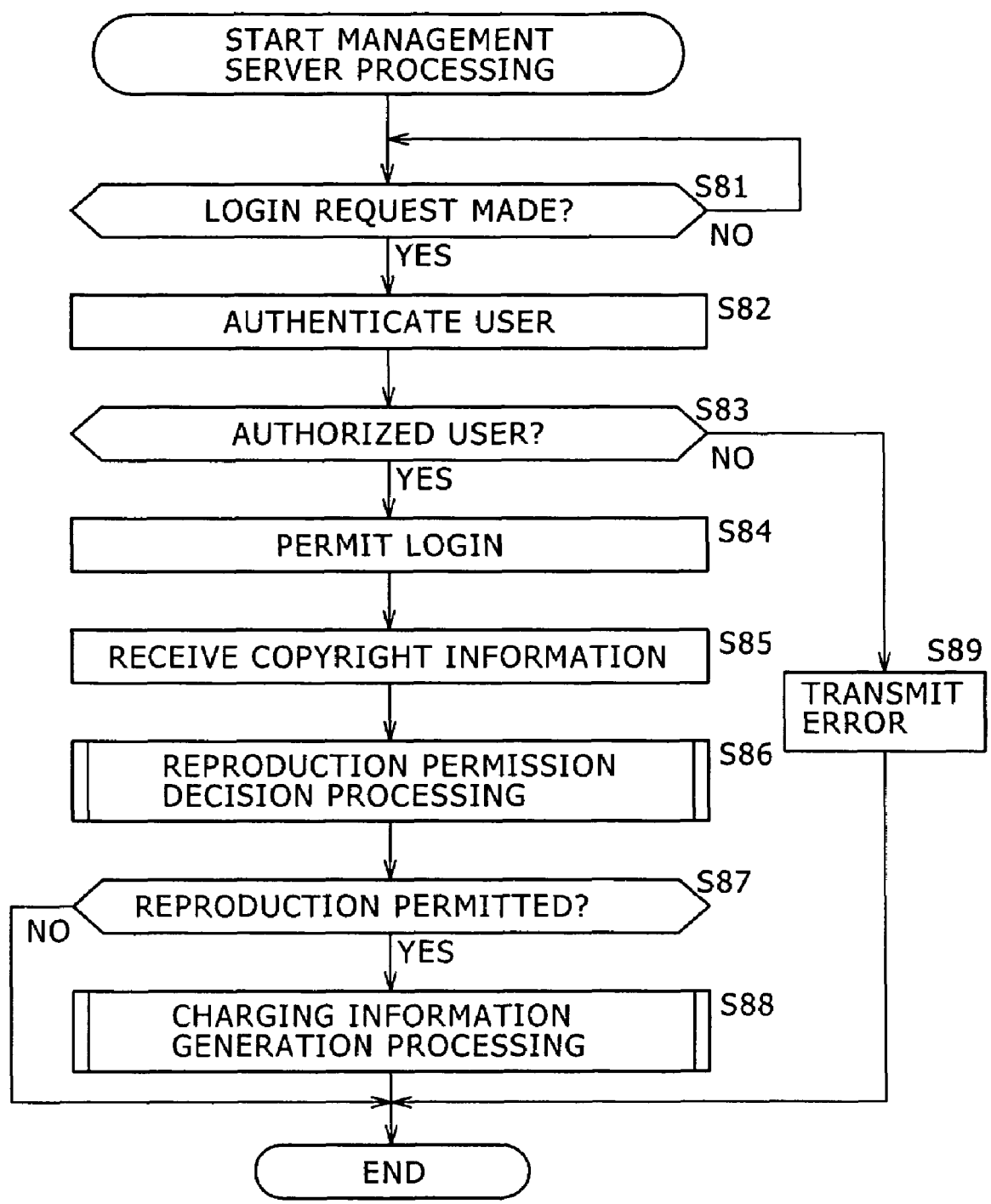
FIG. 12 is a flowchart indicative of the processing to be executed by a management server.

The following describes the processing to be executed by the management server 31 with reference to a flowchart shown in FIG. 12. This processing is executed, in the reproducing unit 13, concurrently with the reproduction processing described above with reference to FIG. 11.

In step S81, the management server 31 determines whether or not a login request has come from the reproducing unit 13 and waits until such a request comes. When the reproducing unit 13 has logged in on the management server 31 in step S51 shown in FIG. 11, then it is determined that there is a login request, upon which the procedure goes to step S82.

In step S82, the management server 31 authenticates the user (of the reproducing unit 13). The authentication is executed on the basis of ID and password for example. In step S83, the management server 31 determines whether or not the user is an authorized user as a result of the authentication done in step S82. If the user is found an authorized user, then the procedure goes to step S84 to permit the login by the reproducing unit 13.

In step S85, the management server 31 receives copyright information. At this moment, in step S53 shown in FIG. 11, the secondary copyright information transmitted from the reproducing unit 13 is received.

In step S86, the management server 31 executes a reproduction permission decision to be described with reference to FIG. 13. Consequently, the permission of rejection of the reproduction of tone data is determined.

Figure 13:
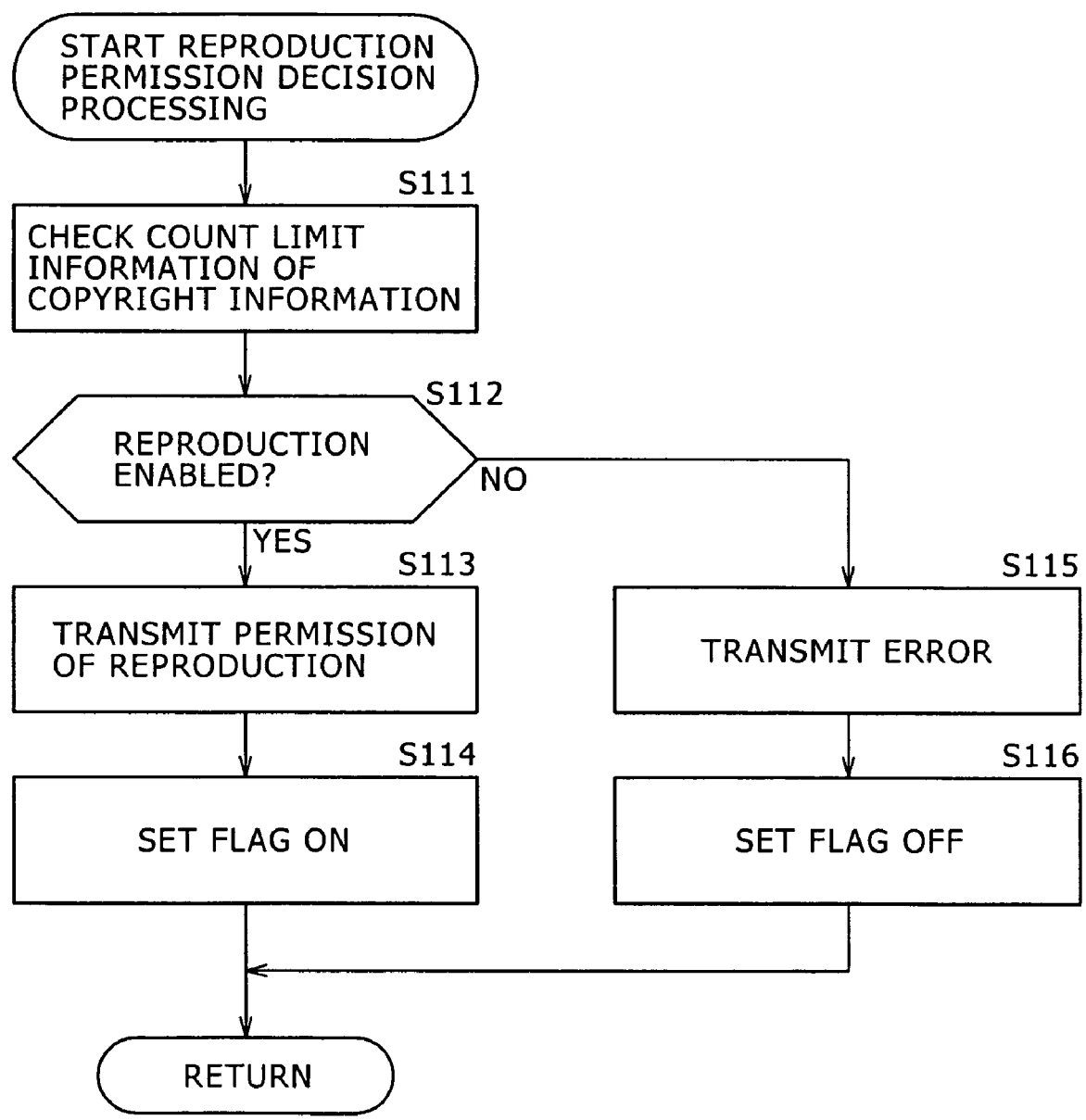
FIG. 13 is a flowchart indicative of reproduction permission decision processing.

The following describes in detail the reproduction permission decision processing of step S86 shown in FIG. 12 with reference to a flowchart shown in FIG. 13.

In step S111, the management server 31 checks the reproduction count limit (FIG. 5) of the copyright information received in step S85. The value of the reproduction count limit of copyright information is decremented by one every time that tone data is reproduced, for example.

In step S112, the management server 31 determines on the basis of the value of the reproduction count limit checked in step S111 whether or not the reproduction of the tone data is to be permitted. In this case, if the value of the reproduction count limit is one or more, the reproduction is permitted.

If the reproduction of tone data is found permitted in step S112, then the procedure goes to step S113, in which the management server 31 transmits the information indicative of the permission of reproduction to the reproducing unit 13. This information is received by the reproducing unit 13 in step S54 shown in FIG. 11 as a response from the management server 31.

After the processing of step S113, the management server 31 turns on the flag indicative of the transmission of the permission of reproduction in step S114.

On the other hand, if the reproduction of tone data is found not permitted in step S112, then the procedure goes to step S115, in which the management server 31 transmits an error to the reproducing unit 13. This error signal is received in step S54 of FIG. 11 by the reproducing unit 13 as a response from the management server 31. After the processing of S115, the management server 31 turns off the above-mentioned flag in step S116.

Thus, the permission or rejection of the reproduction of tone data is determined.

Referring to FIG. 12 again, after the processing step S86, the management server 31 determines in step S87 whether or not the reproduction has been permitted or not. If the above-mentioned flag is on, then it indicates the reproduction has been permitted, upon which the procedure goes to step S88, in which the management server 31 executes charging information generation processing to be described later with reference to FIG. 14.

Figure 14:
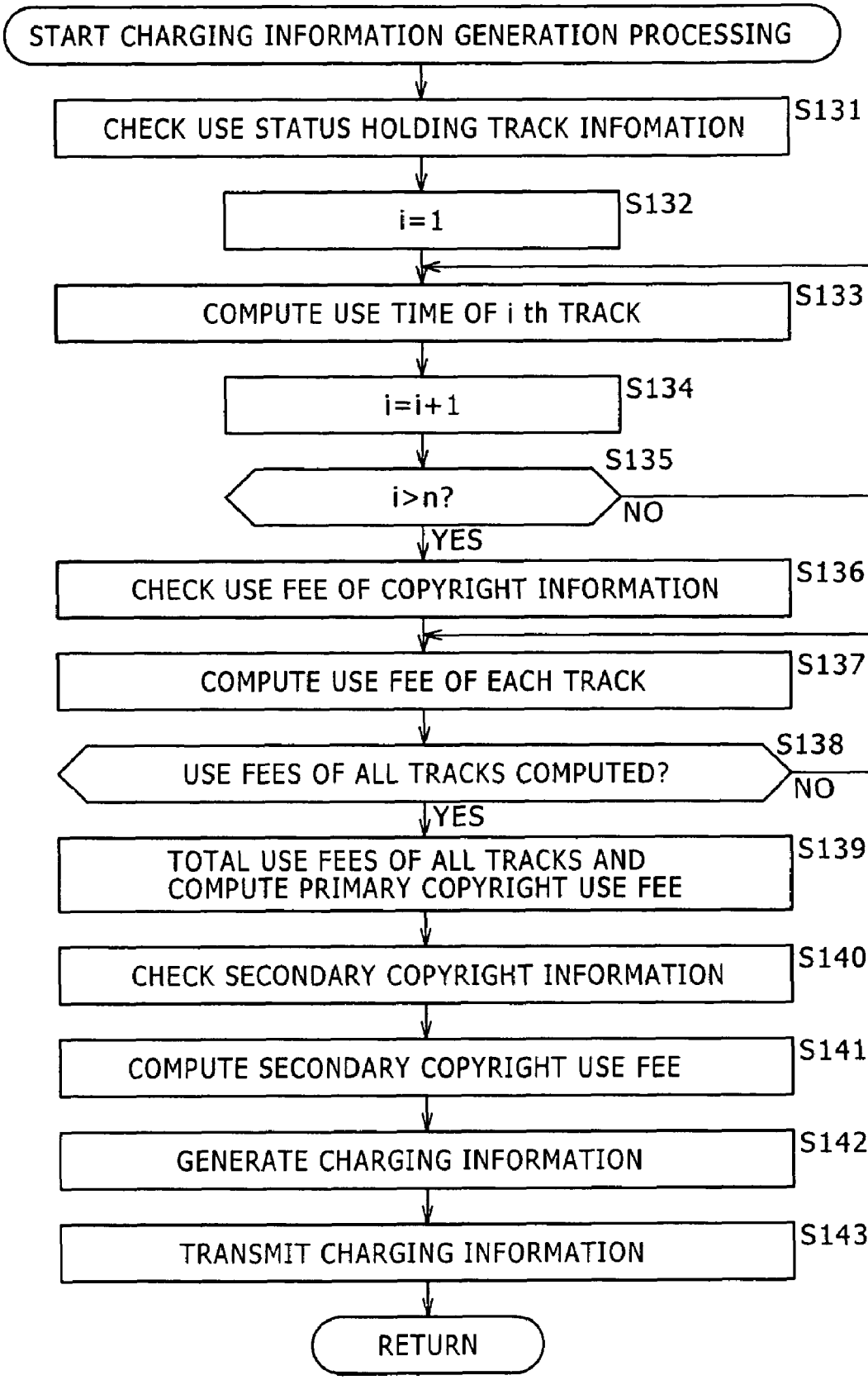
FIG. 14 is a flowchart indicative of charging information generation processing.

The following describes details of charging information generation processing to be executed in step S88 shown in FIG. 12 with reference to a flowchart shown in FIG. 14.

In step S131, the management server 31 checks the information about the use status holding track. At this moment, the information about the use status holding track transmitted from the reproducing unit 13 in step S56 of FIG. 11 is checked. It is supposed here that the information of the use status holding track includes the data stating the status of use of track 1 through track n as with the above-mentioned case described with reference to FIG. 9.

In step S132, the management server 31 sets value 1 to variable i.

In step S133, the management server 31 computes a use period of ith track. For example, if the value of variable i is one, a total time of use of track 1 from use start time ("IN") to use end time ("OUT") on the basis of the data described by a combination of "IN" and "OUT".

In step S134, the management server 31 increments the value of variable i by one. In step S135, the management server 31 determines whether the value of variable i has exceeded n. If this value is found not exceeding n, then the procedure returns to step S133. Namely, the processing operations of steps S133 through S135 are repeated until the use period of each of track 1 through track n is computed.

In step S136, the management server 31 checks the fee of use of copyright information. This check is executed on the contents of the use fee (FIG. 5) included in copyright information 1 through copyright information n that are the primary copyright information corresponding to each of track 1 through track n. Use fee herein denotes the information indicative of the per unit time for the data of each track as described above.

In step S137, the management server 31 computes the use fee of each track. For example, in the computation of the fee for track 1, the use period of track 1 computed in step S133 is multiplied by the use fee per unit time (included in copyright information 1) checked in step S136. The use fees for track 2 through track n are computed in the same manner.

In step S138, the management server 31 determines whether or not the use fees for all tracks have been computed. If there is any track of which use fee has not been computed, the procedure returns to step S137.

If all tracks are found computed in use fee in step S138, then the procedure goes to step S139, in which the management server 31 totals the use fees of all tracks (namely, track 1 through track n in this example) to compute a primary royalty.

In step S140, the management server 31 checks the secondary copyright information. At this moment, the secondary copyright information received in step S85 shown in FIG. 12 is checked.

In step S141, the management server 31 computes a secondary royalty. At this moment, the secondary royalty is computed on the basis of the contents of the use fee (FIG. 5) included in the secondary copyright information.

In step S142, the management server 31 generates charging information on the basis of the primary royalty computed in step S139 and the secondary royalty computed in step S141. AT this moment, the primary copyright information use fee and the secondary royalty may be added for charging or these use fees may be separately charged. The primary royalty is to be paid the above-mentioned copyright holder of original copyrighted work (the performer, for example) and the secondary royalty to the above-mentioned copyright holder of secondary copyrighted work (the club DJ who performed remixing, for example), so that these use fees had better be separately charged for easy charging management.

In step S143, the management server 31 transmits the charging information generated in step S142 to a charging server, and so forth, not shown, via the reproducing unit 13 and a network to have such a charging server execute the charging processing on the use of the reproduced tone data. The transmitted charging information is also received by the reproducing unit 13 in step S58 shown in FIG. 11.

Referring to FIG. 12 again, if the user is found an unauthorized user in step S83, the procedure goes to step S89, in which the management server 31 transmits an error signal, which is received by the reproducing unit 13 in step S54 shown in FIG. 11.

If the reproduction is found not permitted in step S87, then step S88 is skipped, upon which the reproduction permission processing ends.

Thus, the processing by the management server 31 is executed. Because the reproduction of tone data is permitted on the basis of the reproduction count limit included in the secondary copyright information, the copyright of the remixed tone data (or the secondary copyrighted work) may be properly protected. Also, because charging information is generated on the basis of the primary royalty and the secondary royalty, the use fee for the copyright holder of original copyrighted work and the use fee for the copyright holder of secondary copyrighted work may be properly charged when the remixed tone data that is secondary copyrighted work is reproduced.

The above-mentioned sequence of processing operations may be executed by software as well as hardware. In this example, a computer 300 as shown in FIG. 15 is incorporated in each of the recording unit 11, editing unit 12, and the reproducing unit 13.

Referring to FIG. 15, a CPU (Central Processing Unit) 301 executes various processing operations as instructed by programs stored in a ROM (Read Only Memory) 302 or loaded from a storage block 308 into a RAM 303. The RAM 303 also stores, from time to time, data necessary for the CPU 301 to execute various processing operations.

The CPU 301, the ROM 302, and the RAM (Random Access Memory) 303 are interconnected with a bus 304. This bus 304 is also connected with an input/output interface 305.

The input/output interface 305 is connected with an input block 306 made up of a keyboard and a mouse for example, an output block 307 made up of a display monitor based on CRT (Cathode Ray Tube) or LCD (Liquid Crystal Display) for example and a speaker for example, the storage block 308 made up of a HDD for example, and a communication block 309 made up of a network interface card for example. The communication block 309 executes communication processing via a network such as the Internet.

The input/output interface 305 is also connected with a drive 310 as required, on which a removable medium 311 such as magnetic disk, optical disk, magneto-optical disk, or a semiconductor memory is loaded as required. Computer programs read from the loaded removable medium are installed in the storage block 308, as required.

When the above-mentioned sequence of processing operations is executed by software, the programs constituting the software are installed in the above-mentioned computer from a recording medium such as the above-mentioned removable recording medium 311 for example.

These recording media are constituted by not only the removable medium 311 made up of the magnetic disk (including floppy disk (trademark)), the optical disk (including CD-ROM (Compact Disk Read Only Memory) and DVD (Digital Versatile Disk)), the magneto-optical disk (including MD (Mini Disk) (trademark)), or the semiconductor memory which is distributed separately from the apparatus itself as shown in FIG. 15, but also the ROM 302 or the HDD which stores programs and is provided to users as incorporated in the apparatus itself.

It should be noted herein that the steps for describing each program recorded in recording media include not only the processing operations which are sequentially executed in a time-dependent manner but also the processing operations which are executed concurrently or discretely.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. An information processing apparatus comprising:
   first generating means for editing tone data including a plurality of tracks, based on an operation by a user, by using each data of said plurality of tracks, to generate tone data including a smaller number of tracks, said tone data being secondary copyrighted work with said tone data including said plurality of tracks being original copyrighted work;
   second generating means for generating a use information track describing information with describing how date of each track of said tone data of said original copyrighted work is used in said tone data generated by said first generating means; and
   setting means for setting first copyright information with the user who edited tone data of original copyrighted work specified as a copyright holder to said tone data generated by said first generating means and data of said use information track generated by said second generating means.

2. The information processing apparatus according to claim 1, wherein second copyright information is set each track of said tone data including a plurality of tracks that is original copyrighted work, said second copyright information including information about a person who created said track data as a copyright holder.

3. The information processing apparatus according to claim 2, wherein at least one of said first copyright information and said second copyright information includes:
   information about a reproduction count limit indicative of a number of times data to which at least one of said first copyright information and said second copyright information is set; and
   information about a use fee per unit time of data to which at least one of said first copyright information and said second copyright information is set.

4. The information processing apparatus according to claim 3, wherein reproduction of said tone data generated by said first generating means, it is determined whether or not said tone data is permitted for reproduction based on said first copyright information.

5. The information processing apparatus according to claim 3, wherein said use information track at least includes:
   information about a period of time in which each data of said plurality of tracks has been used; and
   said second copyright information corresponding to each of said plurality of tracks.

6. The information processing apparatus according to claim 5, wherein, in reproduction of said tone data generated by said first generating means,
   a primary royalty is computed based on said information about a period of time in which each data of said plurality of tracks has been used and said second copyright information;
   a secondary royalty is computed based on said first copyright information; and
   charging information for the reproduction of said tone data is generated on the basis of said primary royalty and said secondary royalty.

7. An information processing method comprising:
   generating, for editing tone data including of a plurality of tracks, based on an operation by a user, by using each data of said plurality of tracks, to generate tone data including a smaller number of tracks, said tone data being secondary copyrighted work with said tone data including said plurality of tracks being original copyrighted work;
   generating a use information track describing information which describing how data of each track of said tone data of said original copyrighted work is used in said tone data generated; and
   setting first copyright information with the user who edited tone data of original copyrighted work specified as a copyright holder to said tone data generated and data of said use information track generated.

8. A computer program product embodied on a computer readable medium, the computer program product comprising:
   means for generating control, for editing tone data including a plurality of tracks, based on an operation by a user, by using each data of said plurality of tracks, to control generation of tone data including a smaller number of tracks, said tone data being secondary copyrighted work with said tone data including said plurality of tracks being original copyrighted work;

means for controlling generation of a use information track describing information which describing how data of each track of said tone data of said original copyrighted work is used in said tone data generated by said first generating control; and means for setting control, for controlling setting of first copyright information with a user who edited tone data of original copyrighted work specified as a copyright holder to said tone data generated by said first generating control step and data of said use information track generated by said controlling generation.

9. An information processing apparatus comprising:

a first generating unit for editing tone data including a plurality of tracks, based on an operation by a user, by using each data of said plurality of tracks, to generate tone data including a smaller number of tracks, said tone data being secondary copyrighted work with said tone data including said plurality of tracks being original copyrighted work;

a second generating unit for generating a use information track describing information which describing how data of each track of said tone data of said original copyrighted work is used in said tone data generated by said first generating means; and a setting unit for setting first copyright information with the user who edited tone data of original copyrighted work specified as a copyright holder to said tone data generated by said first generating means and data of said use information track generated by said second generating means.

* * * * *